Figure 1:
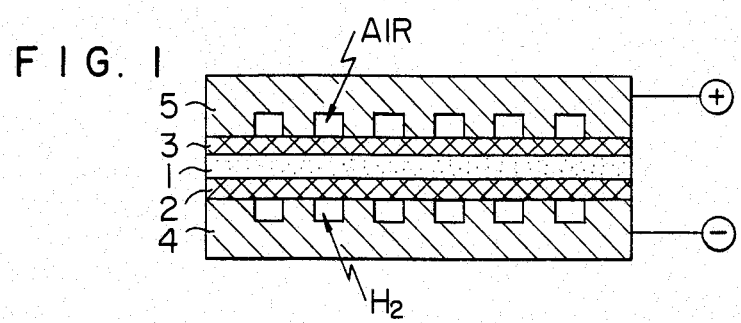

United States Patent [19]

Kahara et al.

[11] Patent Number: 4,493,879
[45] Date of Patent: Jan. 15, 1985

[54] FUEL CELL

[75] Inventors: Toshiki Kahara; Shimpei Matsuda, both of Ibaraki; Kenzo Ishii, Hitachi; Seizi Takeuchi, Hitachiota; Jinichi Imahashi; Akio Honji, both of Hitachi, all of Japan

[73] Assignees: Hitachi, Ltd.; Hitachi Chemical Company, Ltd., both of Tokyo, Japan

[21] Appl. No.: 357,278

[22] Filed: Mar. 11, 1982

[30] Foreign Application Priority Data

Mar. 18, 1981 [JP] Japan .................. 56-37844
Mar. 18, 1981 [JP] Japan .................. 56-37845
Mar. 18, 1981 [JP] Japan .................. 56-37846

[51] Int. Cl.³ .............................. H01M 4/86
[52] U.S. Cl. ............................ 429/41; 429/44; 429/46
[58] Field of Search ............. 429/41, 44, 45, 46

[56] References Cited

U.S. PATENT DOCUMENTS

| | | | |
|---|---|---|---|
| 3,453,149 | 7/1969 | Adlhart et al. | 136/153 |
| 3,567,666 | 3/1971 | Berger | 429/41 X |
| 3,953,237 | 4/1976 | Epstein et al. | 429/41 |
| 4,017,664 | 4/1977 | Breault | 429/4 X |
| 4,066,823 | 1/1978 | Armstrong | 429/41 |
| 4,142,024 | 2/1979 | Vanden Berghe | 429/41 |
| 4,275,126 | 6/1981 | Bergmann et al. | 429/41 X |
| 4,317,865 | 3/1982 | Trocirola | 429/41 |
| 4,322,482 | 3/1982 | Bushnell et al. | 429/41 |
| 4,345,008 | 8/1982 | Breault | 429/41 X |

Primary Examiner—Charles F. LeFevour
Attorney, Agent, or Firm—Antonelli, Terry & Wands

[57] ABSTRACT

A fuel cell comprising a pair of gas diffusion electrodes, an electrolyte retaining matrix disposed between said gas diffusion electrodes, and a phosphoric acid electrolyte disposed within said matrix, characterized by using as matrix that comprising one or more metal oxides having electronic insulation and insolubility in phosphoric acid and a binder is excellent in phosphoric acid retaining ability and can be used for a long period of time without degradation of the performance of fuel cell.

8 Claims, 7 Drawing Figures

FUEL CELL

This invention relates to a fuel cell using liquid phosphoric acid as electrolyte, particularly to a fuel cell having a structure wherein a matrix retaining phosphoric acid is disposed between a pair of gas diffusion electrodes.

As the matrix for retaining the electrolyte in a phosphoric acid fuel cell, there have been used phenolic resin fiber cloth, a material obtained by binding silicon carbide particles with a water-repellent binder, and the like. A fuel cell having such a matrix is disclosed in U.S. Pat. No. 4,017,664. According to said U.S. patent, the difficulty with a phenolic resin type of matrix is that over a long period of time there is a reaction between the phosphoric acid and the organic material at temperatures greater than about 250° F., and the reaction produces a molecule which adsorbs onto the electrode catalyst and poisons the catalyst, resulting in performance degradation. On the other hand, when there is used a matrix made from silicon carbide particles and a water-repellent binder, the above-mentioned problem which takes place when using the phenolic resin matrix does not take place according to said U.S. patent, however is not completely satisfactory for retaining the phosphoric acid electrolyte.

It is an object of this invention to provide a fuel cell having a matrix which is superior in retaining phosphoric acid to silicon carbide.

This invention provides a fuel cell comprising a pair of gas diffusion electrodes, and a matrix for retaining phosphoric acid electrolyte disposed between said gas diffusion electrodes, characterized in that said matrix comprises one or more metal oxides that are electron-insulative and insoluble in phosphoric acid and one or more binders.

Figure 2:
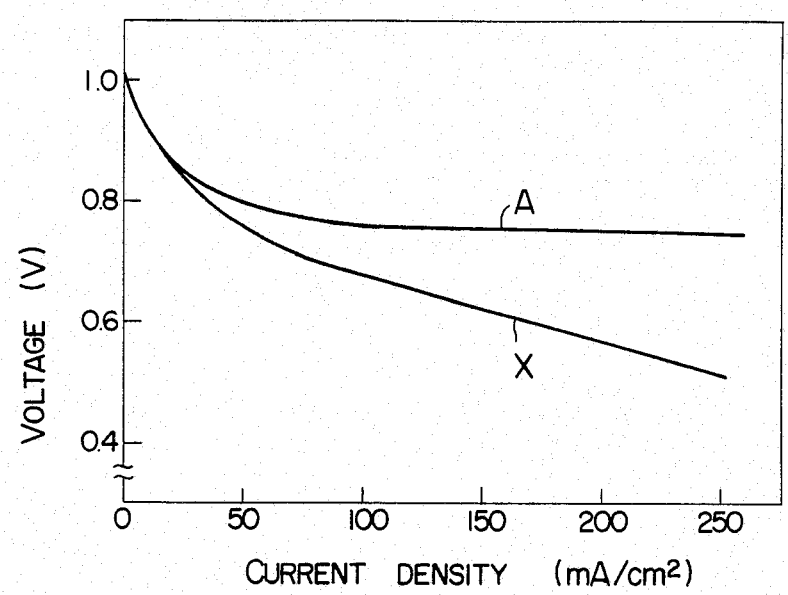
Figure 3:
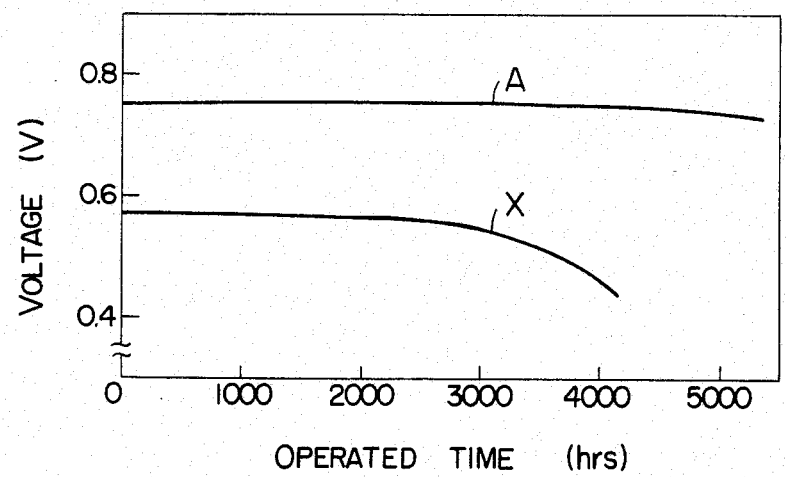
Figure 4:
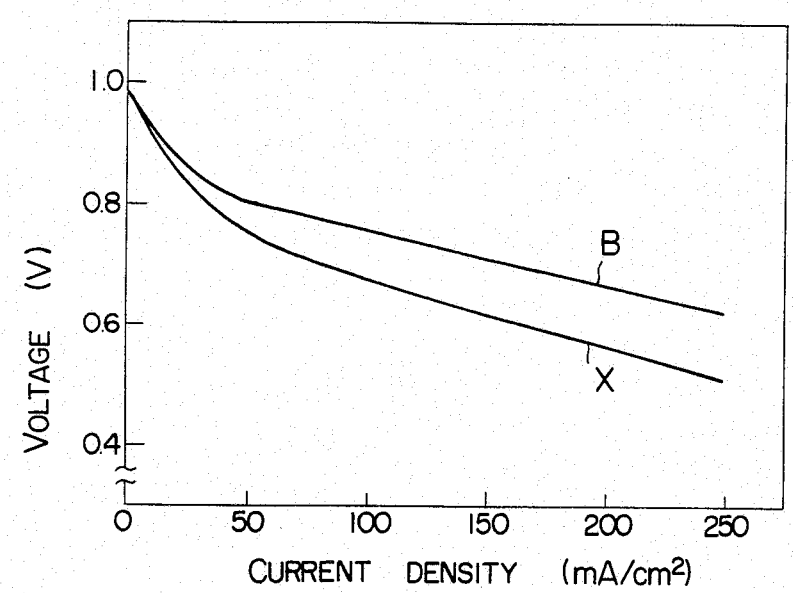
Figure 5:
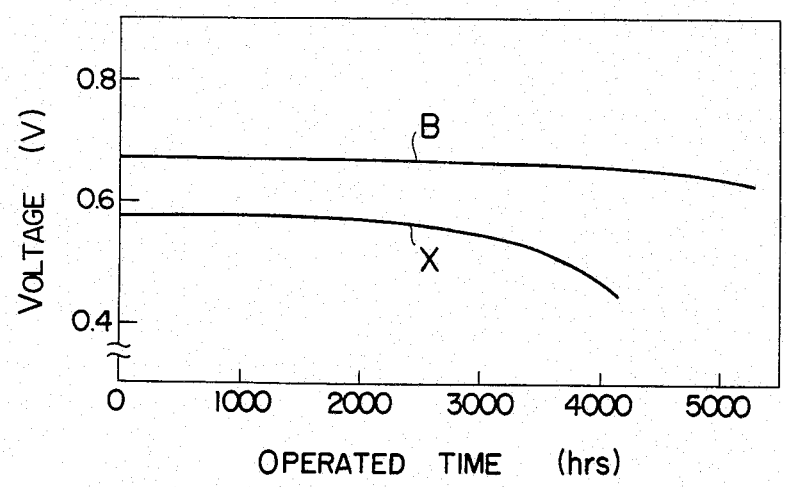
Figure 6:
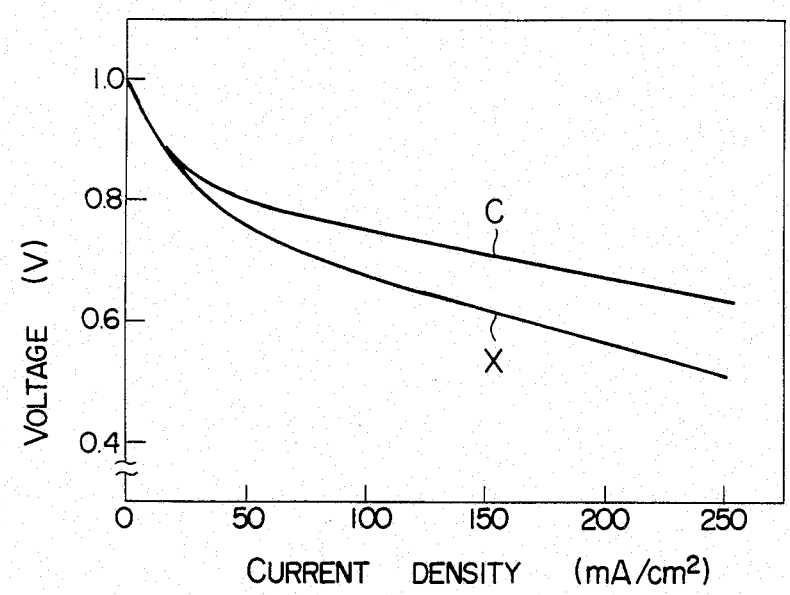
Figure 7:
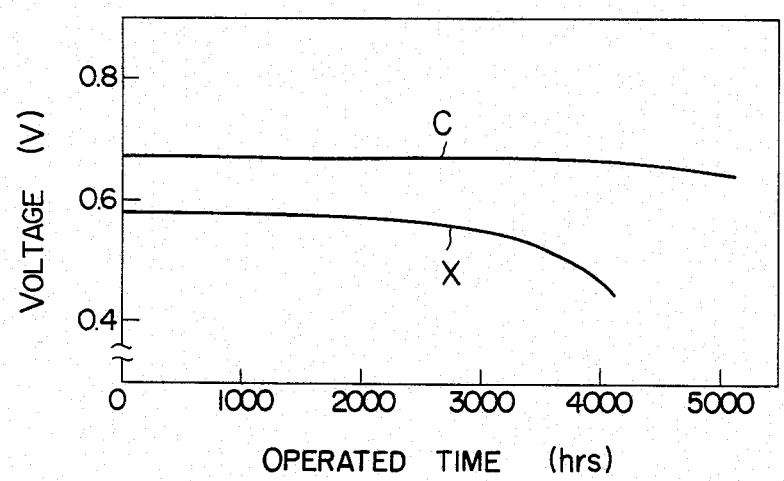

In the attached drawings,

FIG. 1 is a crosssectional view of a fuel cell having the special matrix according to this invention, each of FIGS. 2, 4 and 6 is a graph showing a relationship between a current density and a voltage in fuel cells using the matrix according to this invention ahd a conventional matrix, and each of FIGS. 3, 5 and 7 is a graph showing a relationship between an operation time and a voltage in fuel cells using the matrix according to this invention and a conventional matrix.

This invention is explained referring to FIG. 1. The fuel cell of this invention comprises a pair of spaced apart gas diffusion electrodes 2 and 3, and disposed ttherebetween a matrix 1 retaining phosphoric acid. Said one pair of gas diffusion electrodes and the matrix are disposed in a pair of conventional separators 4 and 5. The gas diffusion electrodes may be conventional ones and can be obtained, for example, by coating carbon powders supporting platinum on a carbon paper. In the gas diffusion electrodes, numeral 2 denotes an anode (a fuel electrode) and numeral 3 denotes a cathode (an air electrode). The anode 2 is so designed as to contact with hydrogen and the cathode 3 is so designed as to contact with air.

As for the matrix for retaining phosphoric acid as the electrolyte, it must have the following properties, which are also disclosed in U.S. Pat. No. 4,017,664: (1) it is stable against the phosphoric acid at high temperatures (190°–200° C.), that is, it is not soluble in the phosphoric acid; (2) it has a larger phosphoric acid retaining ability; and (3) it has no electronic conductivity (i.e., it is an electronic insulator).

If the matrix is soluble in phosphoric acid, the properties of phosphoric acid as the electrolyte are damaged and the matrix dissolved in the phosphoric acid migrates to the electrode sides, which has a bad influence upon the properties of the electrodes. Further, if the matrix has electronic conductivity, there takes place a short-circuit within the fuel cell. In order to prevent the short-circuit caused by the matrix, it is preferable to use a matrix having a resistivity of $10^4$ ohm-cm or more at the operation temperature of the fuel cell. In this invention, the electronic insulation is judged whether or not it has a resistivity of $10^4$ ohm-cm or more at the operation temperature of the fuel cell.

It was found for the first time that metal oxides being electron-insulative and insoluble in phosphoric acid are larger in the phosphoric acid retaining ability and superior to silicon carbide. In the matrix having one or more such metal oxides, since the metal oxide is well wettable to phosphoric acid, phosphoric acid is easily retained. Further, the phosphoric acid once retained in the matrix is hardly released therefrom. Therefore, the fuel cell having such a matrix hardly loses the phosphoric acid and shows very little performance degradation.

As the metal oxides being electron-insulative and insoluble in phosphoric acid, there can be used, for example, silicon oxides, zirconium oxides, titanium oxides, aluminum oxides, tin oxides, tantalum oxides, complex oxides containing zirconium. and the like. Among them, preferable metal oxides are $SiO_2$, $ZrO_2$, $TiO_2$, $Al_2O_3$, $SnO_2$ and $Ta_2O_5$. Examples of the complex oxides containing zirconium are a compound containing zirconium and selenium, a compound containing zirconium and phosphorus, a compound containing zirconium and silicon, etc. Among them, zircon ($ZrSiO_4$) is particularly preferable.

When resistivities were measured as to complex oxides containing zirconium, titanium oxides and tin oxides, these oxides had larger values than $10^8$ ohm-cm at the operation temperature (190°–200° C.) of the fuel cell and was more excellent in electron-insulating property than silicon carbide.

In addition, as the metal oxides, those which can form a phosphate when reacted with phosphoric acid in addition to having the electronic insulation and insolubility in phosphoric acid can also preferably be used. In the matrix having such a metal oxide, a part or whole of the metal oxide is converted into a phosphate while retaining the phosphoric acid electrolyte. When there is formed a phosphate, which is very wettable to phosphoric acid, the phosphoric acid retaining ability is further enhanced. Examples of such metal oxides which can form phosphates are $SiO_2$, $ZrO_2$, $TiO_2$, $Al_2O_3$ and $SnO_2$.

The matrix containing zircon which is difficult to form a phosphate has the same phosphoric acid retaining ability as those containing phosphates formed.

The electrolyte retaining matrix may comprise either one kind of metal oxide and a binder or, two or more kinds of metal oxides and one or more binders. The matrix may further contain a small amount of conventional matrix material such as silicon carbide, phenolic resin fibers, etc.

The metal oxide has a tendency to shift around within the fuel cell and a short-circuit is caused by the shifting around. In order to prevent the shifting around, a binder is mixed with the metal oxide. The binder may be either water-repellent or hydrophilic. As the binder, there can be used, for example, a fluoropolymer such as polytetrafluoroethylene, fluorinated ethylene-propylene copolymer, etc., or a phenolic resin. Among the fluoropolymers, polytetrafluoroethylene is more preferable than fluorinated ethylene-propylene copolymer, since the former is stronger than the latter in binding force of metal oxide at the operation temperature of the fuel cell. It is preferable to use as the binder at least one member selected from the group consisting of the fluoropolymers and phenolic resins mentioned above in an amount of preferably 15% by weight or less based on the weight of the matrix (the amount of the metal oxide being preferably 85% by weight or more). Since the fluoropolymer is hydrophobic and has a property of repelling phosphoric acid, the use of too large amount of it is not preferable for making the phosphoric acid difficult to enter into pores in the matrix. It is preferable to use a matrix consisting of 95 to 98% by weight of one or more metal oxides and the balance of a binder, that is, the binder is contained in an amount of 2 to 5% by weight.

The metal oxide which is a matrix material can be used in any form such as fibers, particles, and the like. As to the particle size of the metal oxide, since phosphoric acid easily passes through pores formed between the metal oxide particles when these particle sizes become larger, a smaller particle size is preferable. A particle size which can pass a 200-mesh sieve (Tyler standard) is particularly preferable.

With the progress of operation of the fuel cell, the phosphoric acid retained in the matrix tends to be lost gradually by absorption into the electrodes and the separators. But the loss of phosphoric acid in the fuel cell of this invention is smaller than that in the conventional fuel cells using silicon carbide or a phenolic resin alone as the matrix. Therefore, the degradation of cell performance with the lapse of time is very little.

This invention is illustrated by way of the following Examples, in which all percents are by weight unless otherwise specified.

EXAMPLE 1

As the complex oxides containing zirconium as a major component, zircon ($ZrSiO_4$) was used in the form of particles which can pass a 200-mesh sieve. To 98 g of the zircon fine particles, 30 ml of a suspension obtained by suspending about 2 g of polytetrafluoroethylene fine powders in water with a surface active agent was added to give a paste. The resulting mixture was heated at 200° C. for about 8 hours to remove the water, followed by addition of 98% concentrated phosphoric acid to give a matrix retaining the phosphoric acid. The phosphoric acid content was about 50%. The thus produced matrix was coated on a gas diffusion electrode in 0.3 mm thich and another gas diffusion electrode was placed thereon. Subsequently, a fuel cell having a structure as shown in FIG. 1 was produded by a conventional process.

The current density-voltage properties of the resulting fuel cell were measured and plotted as the curve A in FIG. 2 and the change of cell voltage with the lapse of time when continuously operated at a current density of 200 mA/cm$^2$ was also measured and plotted as the curve A in FIG. 3. For comparison, the properties of fuel cell obtained by using silicon carbide as the matrix according to U.S. Pat. No. 4,017,664 were also measured and plotted as the curve X in FIGS. 2 and 3.

As is clear from FIGS. 2 and 3, excellent performance can be obtained when zircon is used as a matrix material compared with the case of using silicon cabide. This seems to be derived from properties of zircon that it has no electronic conductivity, it has a large phosphoric acid retaining ability and it is stable to phosphoric acid.

EXAMPLE 2

To 98 g of titanium oxide fine powders (passing a 200-mesh sieve) obtained by pyrolyzing m-titanic acid at 900° C., was added 30 ml of a suspension obtained by suspending about 2 g of polytetrafluoroethylene fine powders in water with a surface active agent to give a paste. The resulting mixture was heated at 200° C. for about 8 hours to remove the water, followed by addition of 98% concentrated phosphoric acid to give a matrix retaining the phosphoric acid. The phosphoric acid content was about 70%. The thus produced matrix was coated on a gas diffusion electrode in 0.3 mm thick and another gas diffusion electrode was placed thereon. Subsequently, a fuel cell having a structure as shown in FIG. 1 was produced by a conventional process.

The current density-voltage properties of the resulting fuel cell were measured and plotted as the curve B in FIG. 4 and the change of cell voltage with the lapse of time when continuously operated at a current density of 200 mA/cm$^2$ was also measured and plotted as the curve B in FIG. 5. For comparison, the properties of fuel cell obtained by using silicon carbide as the matrix according to U.S. Pat. No. 4,017,664 were also measured and plotted as the curve X in FIGS. 4 and 5.

As is clear from FIGS. 4 and 5, excellent performance can be obtained when the matrix according to this invention is used compared with the case of using silicon carbide.

EXAMPLE 3

To 98 g of stannic oxide fine powders (passing a 200-mesh sieve), was added 30 ml of a suspension obtained by suspending about 2 g of polytetrafluoroethylene fine powders in water with a surface active agent to give a paste. The resulting mixture was heated at 200° C. for about 8 hours to remove the water, followed by addition of 98% concentrated phosphoric acid to give a matrix retaining the phosphoric acid. The phosphoric acid content was about 70%. The thus produced matrix was coated on a gas diffusion electrode in 0.3 mm thick and another gas diffusion electrode was placed thereon. Subsequently, a fuel cell having a structure as shown in FIG. 1 was produced by a conventional process.

The current density-voltage properties of the resulting fuel cell were measured and plotted as the curve C in FIG. 6 and the change of cell voltage with the lapse of time when continuously operated at a current density of 200 mA/cm$^2$ was also measured and plotted as the curve C in FIG. 7. For comparison, the properties of fuel cell obtained by using silicon carbide as the matrix according to U.S. Pat. No. 4,017,664 were also measured and plotted as the curve X in FIGS. 6 and 7.

As is clear from FIGS. 6 and 7, excellent performance can be obtained when the matrix according to this invention is used compared with the case of using silicon carbide.

What is claimed is:

1. In a fuel cell comprising a pair of gas diffusion electrodes and a matrix retaining phosphoric acid electrolyte, disposed between said gas diffusion electrodes, the improvement wherein said matrix comprises one or more metal oxides being electron-insulative and insoluble in phosphoric acid for enlarging the retention of phosphoric acid within said matrix and one or more polymeric binders, wherein the one metal oxide is a complex oxide containing zirconium and selenium, phosphorus, or silicon.

2. A fuel cell according to claim 1, wherein the matrix consists essentially of one or more of the metal oxides and a fluoropolymer or phenolic resin as the binder.

3. A fuel cell according to claim 2, wherein the matrix consists essentially of 95 to 98% by weight of the one or more metal oxides and 2 to 5% by weight of the one or more binders.

4. A fuel cell according to claim 1, wherein the one or more metal oxides are contained in the matrix in an amount of 85% by weight or more.

5. A fuel cell according to claim 1 wherein the binder is contained in the matrix in an amount of 15% by weight or less.

6. A fuel cell according to claim 1 wherein the one binder is polytetrafluoroethylene.

7. In a fuel cell comprising a pair of gas diffusion electrodes and a matrix retaining phosphoric acid electrolyte, disposed between said gas diffusion electrodes, the improvement wherein said matrix comprises zircon and one or more binders.

8. In a fuel cell comprising a pair of gas diffusion electrodes and a matrix retaining phosphoric acid electrolyte disposed between said gas diffusion electrodes, the improvement wherein said matrix consists essentially of 95 to 98% by weight of zircon and 2 to 5% by weight of polytetrafluoroethylene.

* * * * *